(12) United States Patent
Chen et al.

(10) Patent No.: US 8,631,477 B2
(45) Date of Patent: *Jan. 14, 2014

(54) LIFECYCLE MANAGEMENT OF PRIVILEGE SHARING USING AN IDENTITY MANAGEMENT SYSTEM

(75) Inventors: Leanne L. Chen, Laguna Niguel, CA (US); Alexander P. Ames, Irvine, CA (US); Prema Vivekanandan, Kansas City, MO (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

This patent is subject to a terminal disclaimer.

(21) Appl. No.: 12/508,102

(22) Filed: Jul. 23, 2009

(65) Prior Publication Data

US 2011/0023107 A1 Jan. 27, 2011

(51) Int. Cl.
*H04L 29/06* (2006.01)

(52) U.S. Cl.
USPC .......................... 726/6; 726/7; 726/8; 726/9

(58) Field of Classification Search
USPC .......... 726/6, 7, 8, 12, 13, 18, 19, 27, 28, 29, 726/30

See application file for complete search history.

(56) References Cited

U.S. PATENT DOCUMENTS

| 7,886,048 | B1 * | 2/2011 | Holland et al. ............... 709/224 |
|---|---|---|---|
| 8,185,550 | B1 * | 5/2012 | Eichler et al. ................. 707/783 |
| 2005/0015628 | A1 | 1/2005 | Narayanan ...................... 726/19 |
| 2005/0044423 | A1 * | 2/2005 | Mellmer et al. ............... 713/201 |
| 2006/0034179 | A1 | 2/2006 | Carter et al. ................... 370/241 |
| 2007/0073699 | A1 | 3/2007 | Reed ................................ 707/9 |
| 2007/0079358 | A1 | 4/2007 | Lambert et al. ................... 726/2 |
| 2007/0118733 | A1 | 5/2007 | Boogert et al. ............... 713/155 |
| 2007/0157156 | A1 | 7/2007 | Meier et al. .................... 717/101 |
| 2007/0226774 | A1 | 9/2007 | Pardo-Blazquez et al. ........ 726/1 |
| 2007/0245013 | A1 | 10/2007 | Saraswathy et al. .......... 709/223 |
| 2007/0283424 | A1 | 12/2007 | Kinser et al. ...................... 726/5 |

(Continued)

OTHER PUBLICATIONS

Aikema et al., An Account Policy Model for Grid Environments. May 4-8, 2009. In Proceedings of the 4th International Conference on Advances in Grid and Pervasive Computing (GPC '09), Nabil Abdennadher and Dana Petcu (Eds.). Springer-Verlag, Berlin, Heidelberg, 57-68).*

(Continued)

*Primary Examiner* — Eleni Shiferaw
*Assistant Examiner* — Hilary Branske
(74) *Attorney, Agent, or Firm* — Terrile, Cannatti, Chambers & Holland, LLP; Stephen A. Terrile

(57) ABSTRACT

Managing a lifecycle of a shared privileged account via a proxy service which comprises an Identity Management (IdM) system that defines and manages identity services, which in turn manage privileged accounts used to access managed targets. Each of the identity services is mapped to a privilege group of the proxy service and an ID pool manager is implemented to manage sharing of the privileged accounts. A request is generated to access a managed target with a privileged account. A shared privileges module generates a shared ID authorization account and associates it with the requestor. The shared ID authorization account is populated with sign out information for a shared privileged account, which the requestor uses to access the corresponding managed target. When use of the shared privileged account is ended, the shared privileges module disassociates the requestor with the shared privileged account by deleting the shared ID authorization account.

20 Claims, 5 Drawing Sheets

(56) References Cited

U.S. PATENT DOCUMENTS

2008/0082540 A1 4/2008 Weissman et al. .............. 707/9
2008/0098392 A1 4/2008 Wipfel et al. .................. 718/1
2010/0325705 A1* 12/2010 Iverson et al. ................. 726/6

OTHER PUBLICATIONS

U.S. Appl. No. 12/751,461, filed Mar. 31, 2010, Anderson et al.
Feldman, Barak, Achieving Compliance with Privileged Identity Management, Cyber-Ark Software Inc., 2007.

* cited by examiner

LIFECYCLE MANAGEMENT OF PRIVILEGE SHARING USING AN IDENTITY MANAGEMENT SYSTEM

BACKGROUND OF THE INVENTION

1. Field of the Invention

Embodiments of the disclosure relate in general to the field of computers and similar technologies, and in particular to software utilized in this field. Still more particularly, it relates to managing the lifecycle of a shared privileged account.

2. Description of the Related Art

In today's information technology (IT) environment, large numbers of systems and applications are deployed and managed by global teams. With the emergence of new security compliance requirements, IT administrators now need to efficiently manage system accounts that have special privileges. These system accounts have typically been granted these special privileges to perform system management tasks or access application services. Often, there are additional configurations required for these accounts. For example, a script to initiate a unique set of services on the system when a user logs on using the system account. Additionally, these business requirements require the usual identity management services needed to manage the sharing of these accounts.

One example of a privileged account is the root account on a UNIX server, which has special privileges to the system. In an IT environment with hundreds or even thousands of UNIX machines, a group of system administrators must be able to use these privileged accounts to manage systems. At the same time, individual accountability needs to be maintained for security compliance. Since only authorized users are allowed to use these accounts, mechanisms need to be built in to maintain the confidentiality of the account. In addition, mechanisms are needed to prevent multiple users from using the same account concurrently, yet still allowing multiple users to share the same account at different times. Additionally, clear audit trail records need to be maintained to show who can use these accounts at a specific date and time, and who is using the account to access a specific system. This is quite different from the usual identity management scenario where there is a single owner for each account and that person is responsible for remembering his or her password and other account management activities.

Yet another need is when a high level service requires a set of application services from multiple vendors in a service oriented architecture (SOA). Users authenticated to access high-level services need to be able to access services provided by the different application services seamlessly. In many cases, an IT administrator would like to use a pool of identities for the lower level application services and allow the authorized front-end user to be able to share the application while still be able to maintain the accountability of the access. Current approaches are known that support password delivery for privileged accounts but they do not provide management of the account lifecycle. Other approaches enable credentials to be securely shared by multiple users. Still other approaches require users to use multiple products from different vendors to manage privileged account sharing. As a result, users are faced with usability issues and are unable to seamlessly or fully utilize the typical capabilities of an identity management system.

BRIEF SUMMARY OF THE INVENTION

The present invention includes, but is not limited to, a method, system and computer-usable medium for managing the lifecycle of a shared privileged account. In various embodiments, a proxy service is implemented with an Identity Management (IdM) system for managing the lifecycle of shared privileged accounts. In these and other embodiments, a plurality of identity services are defined and managed by the IdM system to respectively control access to plurality of managed targets. In various embodiments, the managed targets may be a system, software application, or resource. In one embodiment, each identity service is configured with a Service Profile comprising a set of configuration files. The Service Profile comprises attributes for manifesting a respective managed target. In these and other embodiments, each of the identity services manage a plurality of privileged accounts.

In various embodiments, the proxy service is coupled to an identity service and a service type is defined to allow sharing of the privileged accounts managed by the identity service. In one embodiment, each proxy service can host sharing of privileged accounts on multiple identity services. In another embodiment, a proxy service profile is implemented to contain attributes that are use to define a filter, which in turn is used to specify the identity services whose privileged accounts will be hosted under the proxy service. The proxy service profile likewise contains attributes used to define a filter to identify the privileged account on each identity service. In various embodiments, each of the identity services can be mapped to a privilege group of the proxy service. In these and other embodiments, an ID pool manager is implemented to manage sharing of the privileged accounts. Each ID pool is mapped to a privilege group of the proxy service. In one embodiment, the ID Pool Manager provides a pluggable interface to allow use of a customized ID pool.

In one embodiment, a request is generated to access a system, application, or resource with a privileged account. The requester designates a start time and date and an ending time and date for use of the privileged account. A shared privileges module generates a shared ID authorization account record, which is then populated with shared privileged account sign-out information associated with the requester for each authorized shared ID access. The shared privileges module then generates a new password for the shared privileged account, which in turn is provided to the requester. The requestor then uses the new password with the shared privileged account to access the corresponding system, application, or resource. Once the shared privileged account access has expired, or its use has ended, the shared privileges module disassociates the requestor with the shared privileged account access, disables use of its corresponding password, and populates the shared ID authorization account record with shared privileged account sign-in information. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
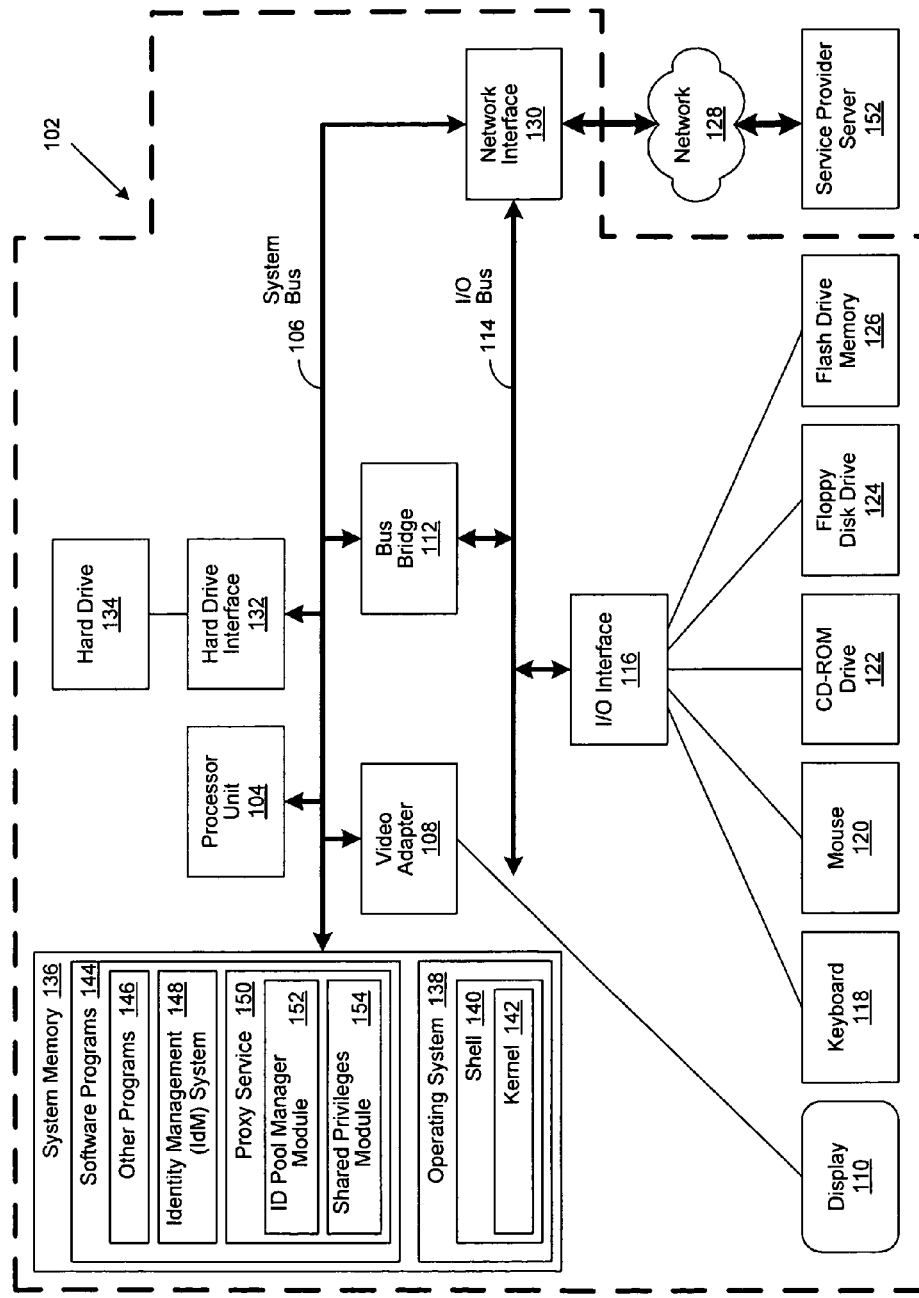
FIG. 1 depicts an exemplary client computer in which the present invention may be implemented.

A method, system, and computer-usable medium are disclosed for managing the lifecycle of a shared privileged account. As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a other programs 146 and an identity management (IdM) system 148. Software programs 144 also include a proxy service 150. In various embodiments, the proxy service comprises an identification (ID) pool manager module 152 and a shared privileges module 154. The proxy service 150 includes code for implementing the processes described in FIGS. 2 through 4 described hereinbelow. In one embodiment, client computer 102 is able to download proxy service 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
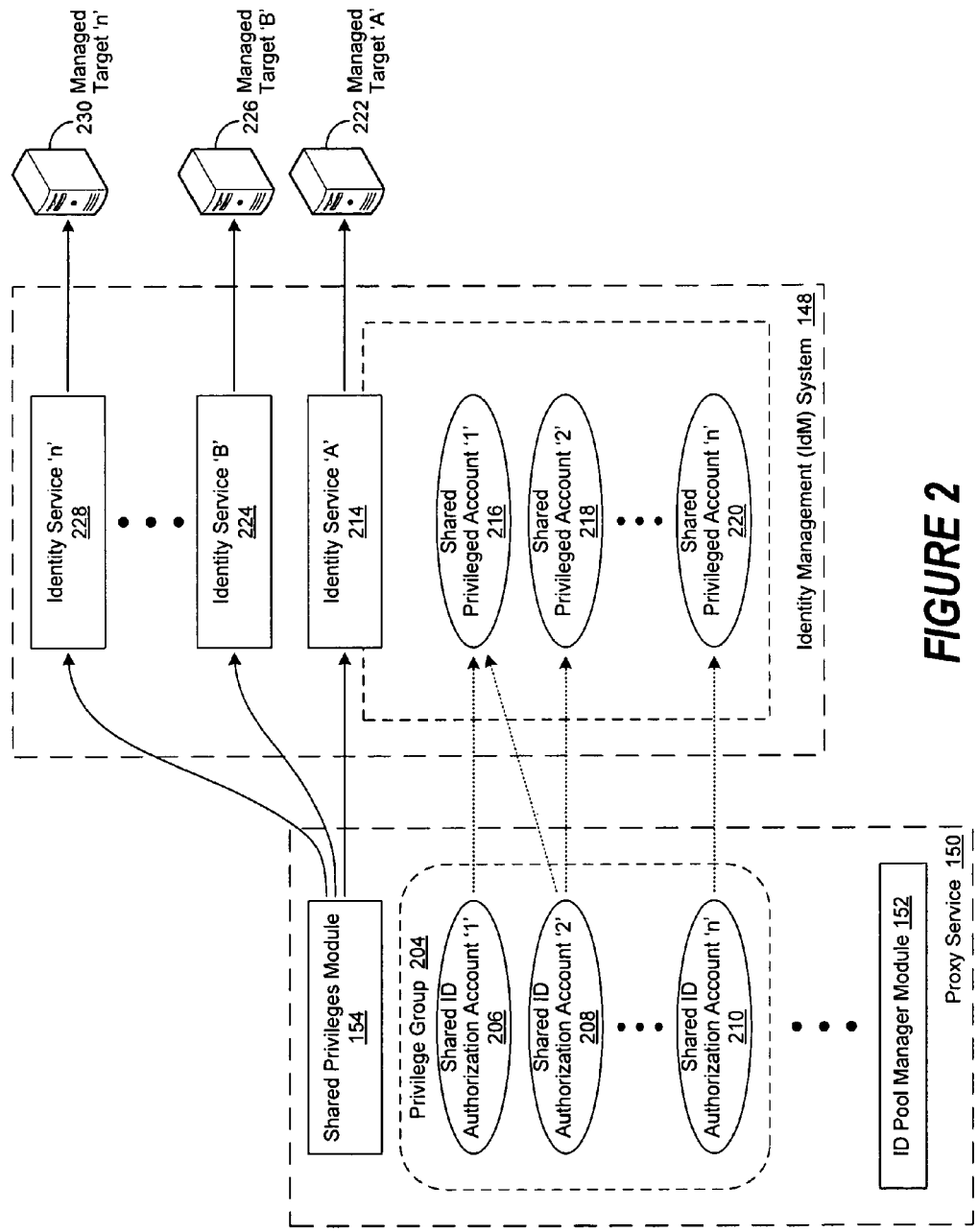
FIG. 2 shows a simplified block diagram of the management of shared ID authorization accounts by a proxy service.

FIG. 2 shows a simplified block diagram of the management of shared ID authorization accounts by a proxy service as implemented in accordance with an embodiment of the invention. In various embodiments, a proxy service 150 is implemented with an Identity Management (IdM) system 148 for the management of shared ID authorization accounts. In various embodiments, the proxy service 150 comprises an ID pool manager module 152 and a shared privileges module 154. As used herein, a privileged account refers to a system account that is accorded special privileges to perform system management tasks, access application services, and other system-level administrative processes familiar to skilled practitioners of the art. One example of a privileged account is the root account on a UNIX server, which has special privileges to the system. Such a privileged account is typically issued to an individual user, such as a system administrator, who has a unique user ID and password combination. As likewise used herein, a shared privileged account refers to a privileged account that is shared between multiple users, each of which have the same privileged account privileges.

In this embodiment, a plurality of identity services 'A' 214, 'B' 224, through 'n' 228 are defined and managed by the IdM system 148 to respectively control access to managed targets 'A' 222, 'B' 226, through 'n' 230. In various embodiments, the managed targets 'A' 222, 'B' 226, through 'n' 230 may be a system, software application, or resource as described in greater detail herein. In one embodiment, each of the identity services 'A' 214, 'B' 224, through 'n' 228 is configured with a Service Profile comprising a set of configuration files. The Service Profile comprises attributes for manifesting a respective managed target. In one embodiment, the Service Profile comprises an extensible mark-up language (XML) schema defined to map the identity service to a particular managed target. In these and other embodiments, each of the identity services A' 214, 'B' 224, through 'n' 228 manage a plurality of shared privileged accounts, such as shared privileged accounts '1' 216, '2' 218, through 'n' 220 managed by identity service 'A' 214. As shown in FIG. 2, the shared privileged accounts '1' 216, '2' 218, through 'n' 220 are used to access managed target 'A' 222. In various embodiments, the proxy service 150 is implemented with the IdM system 148 to provide a consolidated view. In these and other embodiments, the consolidated view comprises the interrelationship of the shared ID authorization accounts '1' 206, '2' 208, through 'n' 210 to the shared privileged accounts '1' 216, '2' 218, through 'n' 220 managed by identity services A' 214, 'B' 224, through 'n' 228 for access to managed targets 'A' 222, 'B' 226, through 'n' 230.

In various embodiments, the proxy service 150 is coupled to the identity services A' 214, 'B' 224, through 'n' 228. In turn, a service type is defined for the proxy service 150 to allow sharing of the shared privileged accounts '1' 216, '2' 218, through 'n' 220. In one embodiment, each proxy service 150 can host sharing of shared privileged accounts '1' 216, '2' 218, through 'n' 220 on multiple identity services (e.g., the identity services A' 214, 'B' 224, through 'n' 228). In another embodiment, a proxy service profile is implemented to contain attributes that are used to define a filter, which in turn is used to specify the identity services whose privileged accounts will be hosted under the proxy service 150. The proxy service profile likewise contains attributes used to define a filter to identify the shared privileged account (e.g., shared privileged accounts '1' 216, '2' 218, through 'n' 220) on each identity service. In various embodiments, each of the identity services A' 214, 'B' 224, through 'n' 228 can be mapped to a privilege group 204 of the proxy service 150. In these and other embodiments, individual shared ID authorization accounts '1' 206, '2' 208 through 'n' 210 are logically mapped to an individual or a plurality of privileged accounts. As shown in FIG. 2, the shared ID authorization account '2' 208 is logically mapped to shared privileged accounts '1' 216 and '2' 218. In various embodiments, the proxy service 150 performs list maintenance operations related to non usage of a shared ID authorization privileged account. As an example, the shared ID authorization account may be deleted if if the user is no longer authorized to have the shared privileged account access. Likewise in these and other embodiments, the proxy service 150 performs shared privileged account ownership maintenance operations. As an example, the access authorization of a privileged account '1' 216, '2' 218, through 'n' 220 may be modified due to reassignment of a user or changes related to a service implemented within a software oriented architecture (SOA). In this embodiment, the sharing privilege for shared privileged account '1' 216 is mapped to a privilege group 204 of the proxy service 150. Likewise in this embodiment, an ID pool manager is implemented to manage sharing of the shared privileged accounts '1' 216, '2' 218, through 'n' 220. Each ID pool is mapped to the privilege group 204 of the proxy service 150, and it may contain a set of shared privileged accounts '1' 216, '2' 218, through 'n' 220 with the same privilege. In one embodiment, the ID Pool Manager provides a pluggable interface to allow use of a customized ID pool.

In various embodiments, a request is generated to access a system, application, or resource, such as managed target 'A' 222, 'B' 226, through 'n' 230 with a shared privileged account, such as privileged account '1' 216, '2' 218, through 'n' 220. The requester designates justification for use of the shared privileged account '1' 216, '2' 218, through 'n' 220, followed by the performance of approval definition and management processes related to accessing the shared privileged account '1' 216, '2' 218, through 'n' 220. In various embodiments, the approval definition and management processes comprise role maintenance operations related to the requestor's access roles used for privileged account sharing. If the requester is approved for use of the shared privileged account '1' 216, '2' 218, through 'n' 220, a shared privileges module generates a shared ID authorization account '1' 206, '2' 208, through 'n' 210 record. The shared privileges module 154 populates the shared ID authorization account '1' 206, '2' 208, through 'n' 210 record with shared ID authorization account sign-out information associated with the requester. In one embodiment, the sign-out information comprises the start time and date and the ending time and date for use of the shared ID authorization account. In another embodiment, the sign-out information comprises a unique identification (ID) of the requestor and the group of the proxy service they are associated with. In yet another embodiment, the shared ID authorization account sign-out information comprises information related to the system, application, or resource will be accessed with the shared ID authorization account.

Once the shared ID authorization account record has been populated with shared ID authorization account sign-out information, the shared privileges module 154 generates a new password for the shared ID authorization account, which in turn is provided to the requester. The requester then uses the new password with the shared privileged account to access the corresponding system, application, or resource.

Once the shared privileged account access has expired, then the shared privileges module 154 initiates the performance of shared ID authorization account sign-in operations. First, the shared privileges module 154 invokes the shared privileged ID pools manager module 152 to disassociate the requester with the shared ID authorization account so it is available for other requesters. The shared privileges module 154 then disables use of the password corresponding to the shared ID authorization account. The shared privileges module 154 then populates the shared ID authorization account with shared ID authorization account sign-in information. In one embodiment, the shared ID authorization account sign-in information comprises a shared ID authorization account sign-in time and date if it is earlier than the ending time and date requested by the requester. In various embodiments, the shared privileges module 154 uses the shared ID authorization account sign-out/sign-in information to perform operations related to the maintenance of each requestor's accountability for the use of a shared ID authorization account. In these and other embodiments, the shared privileges module 154 uses the shared ID authorization account sign-out/sign-in information to generate shared privileged account usage reports, and associated audit trail information, for shared privileged account lifecycle events.

Figure 3:
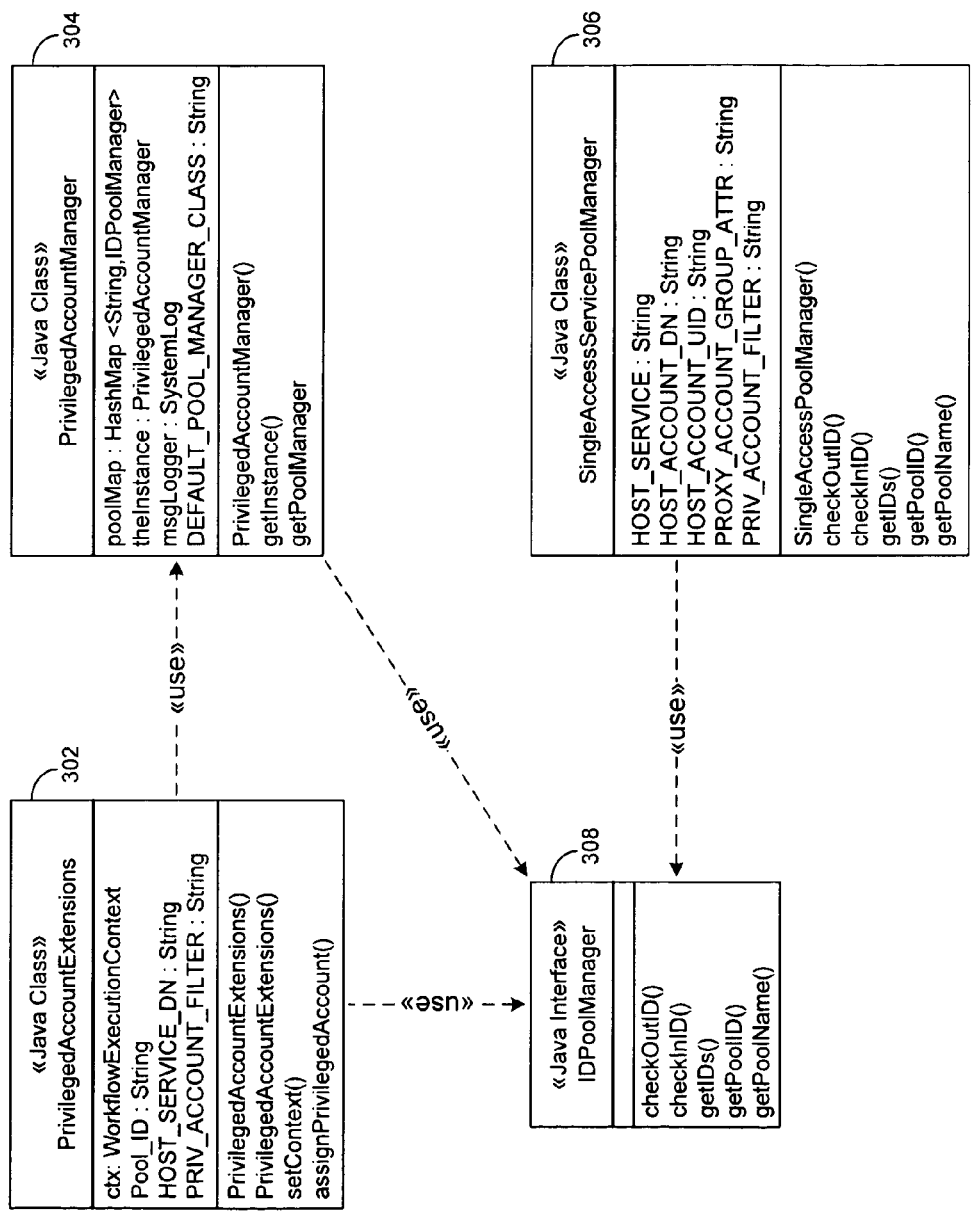
FIG. 3 shows a class diagram of a shared privileged account pool manager.

FIG. 3 shows a class diagram of a shared privileged account identification (ID) pool manager as implemented in accordance with an embodiment of the invention. In various embodiments, an ID pool manager is implemented to manage the sharing of privileged accounts by a pool of IDs as described in greater detail herein. In this embodiment, a Java interface defined by IDPoolManager 308 uses Java classes PrivilegedAccountExtensions 302, PrivilegedAccountManager 304, and SingleAccessServicePoolManager 306. In turn, Java class PrivilegedAccountExtensions 302 uses Java class PrivilegedAccountManager 304. In various embodiments, a plurality of ID pool managers 308 are implemented, each of which provides management of the shared IDs in the pool. In one embodiment, a single ID pool manager 308 is implemented to ensure that an individual ID can only be used by one requestor at a time. In this embodiment, the Single-AccessPoolManager 306 places an exclusive lock on the ID when it is signed out by one requester such that no other requester is able to sign it out. The exclusive lock is then released by the SingleAccessPoolManager 306 when the ID is signed in by the requester. In various embodiments, additional controls are provided for the visibility of ID credentials, such as a password. As an example, if the IDPoolManager 308 is not enabled with Single Sign On (SSO), and the requester needs to obtain the password to directly log onto a resource, then the password needs to be changed each time the ID is signed out. Doing so prevents the requester from accessing the resource once the ID signed in. However, if the IDPoolManager 308 is enabled with SSO, then the password is not visible to the requester. Instead, it is implicitly passed to the resource authentication mechanism of the resource. Accordingly, there is no need to change the password each time the ID is signed in.

As shown in FIG. 3, each ID pool is mapped to the privilege group of the proxy service, and it may contain a set of shared privileged accounts with the same privilege. In one embodiment, the ID Pool Manager provides a pluggable interface to allow use of a customized ID pool. The ID Pool Manager Implementation class may be associated with each type of proxy service. As shown in FIG. 3, a default ID Pool Manager allows a single user to use a shared ID authorization account during a specific time period.

Figure 4A:
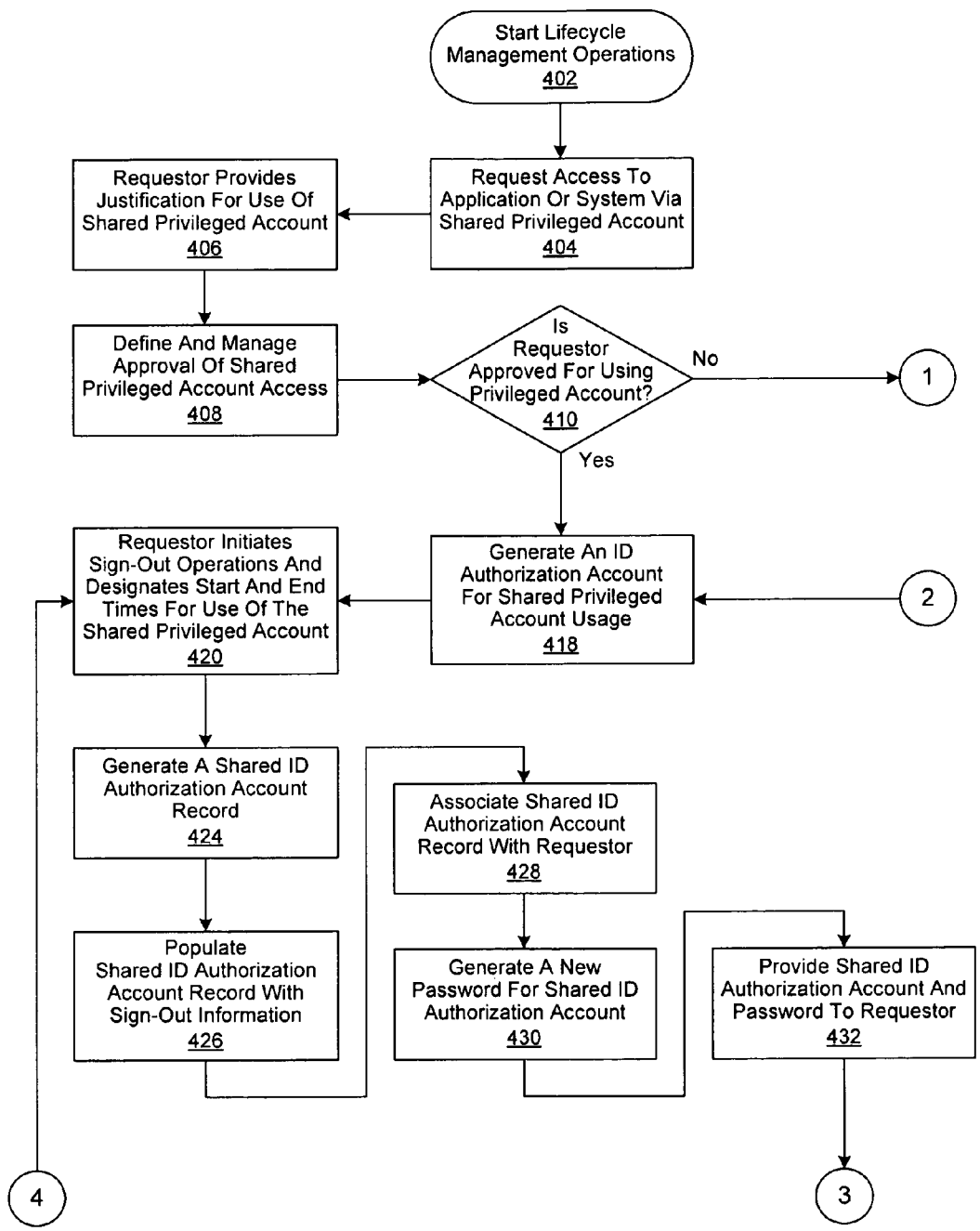
FIGS. 4a-b are flow charts for managing the lifecycle of shared privileged accounts.
Figure 4B:
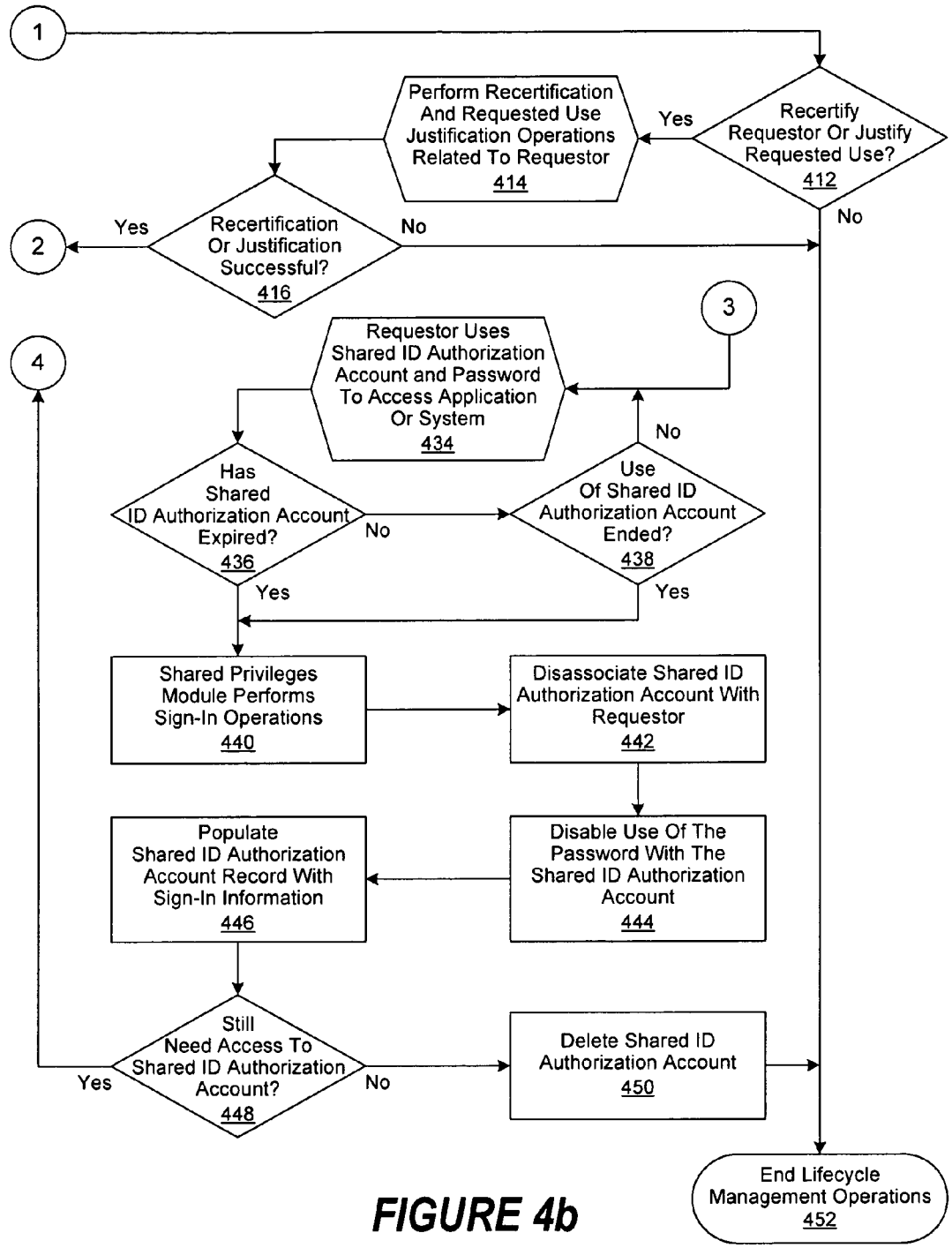

FIGS. 4a-b are flow charts for managing the lifecycle of shared privileged accounts as implemented in accordance with an embodiment of the invention. In various embodiments, a proxy service is implemented with an Identity Management (IdM) system for the management of shared privileged accounts. In these and other embodiments, the proxy service comprises an identification (ID) pool manager for assigning a group of the proxy service to a shared privileged account and a shared privileges module for managing the lifecycle of a shared privileged account. In this embodiment, shared privileged account lifecycle management operations are begun in step 402, followed by the generation of a request to access a system, application, or resource with a shared privileged account in step 404. In one embodiment, a group of the proxy service is mapped to individual systems, applications, and resources that will be accessed with the requested privileged account. In step 406, the requester provides justification for use of the shared privileged account. It will be appreciated that in various embodiments, the requestor may be a user, a software application, or a service, such as typically implemented in a service oriented architecture (SOA) familiar to those of skill in the art.

In step 408, approval definition and management processes are performed related to accessing shared privileged accounts. In various embodiments, the proxy service is coupled to a plurality of identity services, each of which is defined in an IdM system and manages a plurality of privileged accounts. In one embodiment, a filter is implemented to specify the identity services whose privileged accounts will be hosted by the proxy service as shared privileged accounts. In another embodiment, a group of the proxy service is assigned to a shared privileged account by an ID pool manager. A determination is then made in step 410 whether the requester is approved for shared use of the privileged account. As an example, the requestor's employment has been terminated and they are no longer allowed access to the employer's systems, either through individual accounts managed by the IdM system, privileged accounts, or shared ID authorization accounts. As another example, the requester may be denied shared account privileges if his or her job responsibilities have changed, resulting in a corresponding change in their respective privileges. If it is determined in step 410 that the requester is not approved for use of the privileged account by the IdM system, then a determination is made in step 412 whether to perform recertification or requested use justification operations related to the requester. As an example, the requestor is a terminated employee and they are no longer allowed access to a managed resource. As a result, then requester recertification and use justification operations are not required and the shared privileged account lifecycle management operations are ended in step 452. However, if it is determined in step 412 to perform recertification or requested use justification operations, then they are performed by the IdM system in step 414. As an example, the identity certification of the requester may have expired and the requestor's identity needs to be recertified. As another example, justification of the requestor's request to access a system may require justification and further authorization. Skilled practitioners of the art will realize that in these and other embodiments, the IdM system is implemented for authentication and sharing operations and the shared privileges module is implemented for sharing a privileged account with an authenticated and authorized requester. It will likewise be appreciated by those of skill in the art that many such examples are possible and the foregoing is not intended to limit the spirit, scope, or intent of the invention.

A determination is then made in step 416 whether the recertification or requested use justification operations were successful. If not, or if it was determined in step 412 not to perform them, then shared privileged account lifecycle management operations are ended in step 452. Otherwise, or if it was determined in step 410 the requester is approved for using the privileged account, then the shared privileges module generates a shared ID authorization account for shared privilege account usage in step 418. The requestor then initiates the performance of shared privileges account sign-out operations in step 420, which includes the provision of start and end times for use of the shared privileged account. A shared ID authorization account record is then generated in step 424. In step 426, the shared privileges module populates the shared ID authorization account record with shared privileges account sign-out information. In one embodiment, the shared privileges account sign-out information comprises the start time and date and the ending time and date for use of the shared ID authorization account. In another embodiment, the shared privileges account sign-out information comprises a unique identification (ID) of the requestor and the group of the proxy service they are associated with. In yet another embodiment, the shared privileges account sign-out information comprises information related to the system, application, or resource will be accessed with the shared ID authorization account.

Once the shared ID authorization account record has been populated with shared privileges account sign-out information, the shared privileges module associates the shared ID authorization account with the requester in step 428. A new password is generated by the shared privileges module for the shared ID authorization account in step 430 and it is then provided to the requester in step 432. The requestor then uses the new password with the shared ID authorization account to access the corresponding system, application, or resource in step 434. A determination is then made in step 436 whether the shared ID authorization account has expired (e.g., the ending time and date has been reached). If not, then a determination is made in step 438 whether use of the shared ID authorization account has ended. If not, then the process continues, proceeding with step 434.

However, if it is determined in step 436 that the shared ID authorization account has expired, or in step 438 that its use has ended, then the shared privileges module initiates the performance of shared privileges account sign-in operations in step 440. In step 442, the shared privileges module disassociates the requester with the shared ID authorization account, and then disables use of its corresponding password in step 444. In one embodiment, the corresponding password is automatically reset upon completion of the shared privileges account sign-in operations. The shared privileges module then populates the corresponding shared privilege account record with shared privileges account sign-in information in step 446. In one embodiment, the shared privileges account sign-in information comprises a shared privileges account sign-in time and date if it is earlier than the ending time and date requested by the requester. A determination is then made in step 448 whether the requestor still requires access to the shared ID authorization account. If so, the process is continued, proceeding with step 420. Otherwise, the shared privileges module deletes the shared ID authorization account in step 450 and shared privileged account lifecycle management operations are ended in step 452. In various embodiments, lifecycle events associated with each of the steps shown in FIGS. 4*a-b* are captured by the shared privileges module to provide an audit trail. Such audit trails provide information such as identity information related to the requester, when they requested access, and for what purpose. Additional information provided by the audit trails include which entities were involved in the performance of operations related to: ID sign-out and sign-in, access approval and rejection, revalidation of the requester, resource use justification, and termination of shared ID access.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
   a processor;
   a data bus coupled to the processor; and
   a computer-usable medium embodying computer program code, the computer-usable medium being coupled to the data bus, the computer program code providing lifecycle management of privilege sharing and comprising instructions executable by the processor and configured for:
   providing a proxy service to a plurality of identity services, each identity service being defined in an identity management system and managing a plurality of privileged accounts;
   defining a filter to specify the identity services whose privileged accounts will be hosted by the proxy service;
   assigning a group of the proxy service to a shared ID authorization account, the assigning to the respective account being managed by an identification (ID) pool manager; and
   sharing the use of the privileged account with the shared ID authorization account;
   wherein the lifecycle of a shared privileged account is managed by performing:
   an account access authorization request operation in response to a shared privileged account being received by the proxy service, wherein the access request operation obtains approval of access;
   an account sign-out operation in response to a shared ID authorization account request being received by the proxy service, wherein the account sign-out operation:
      generates a shared ID authorization account record comprising the shared usage relationship of the shared ID authorization account and the requestor and account sign-out information;
      associates the shared ID authorization account with the requestor;
      generates a new password for use of the shared ID authorization account by the requestor; and
   an account sign-in operation upon expiration of the shared ID authorization account or its end of use by the requestor, wherein the account sign-in operation:
      disassociates the shared privileged account from the requestor;
      disables the use of the new password with the shared privileged account;
      updates the shared ID authorization account record with account sign-in information; and
   an authorization removal operation deleting the shared ID authorization account when access to the system is no longer needed.

2. The system of claim 1, further comprising:
   mapping respective systems and applications to the group, wherein the shared privileged account is used by the group to access the respective systems and applications.

3. The system of claim 1, further comprising managing the lifecycle of the shared privileged account.

4. The system of claim 3, further comprising deleting the Shared ID authorization account and its associated access to the respective systems and applications.

5. The system of claim 1, wherein the password of the privileged account is automatically reset upon deletion of the shared ID authorization account.

6. The system of claim 1, wherein recertification and requested use justification operations related to the requestor are performed to recertify the requestor and justify the use of the privileged account by the requestor.

7. The system of claim 1, wherein: the account sign-out information comprises a starting date and a starting time for the requestor to begin use of the shared privileged account; and
   the account sign-in information comprises an ending date and an ending time for the requestor to end use of the shared privileged account.

8. The system of claim 7, wherein the account sign-out and sign-in information is used to generate shared privileged account usage reports and associated audit trail information related to shared privileged account lifecycle events.

9. The system of claim 1, wherein each group comprises a predetermined privilege and contains a pool of privileged accounts managed by the pool manager through a pluggable interface.

10. A non-transitory computer-usable medium embodying computer program code, the computer program code comprising computer executable instructions configured for:
    providing a proxy service to a plurality of identity services, each identity service being defined in an identity management system and managing a plurality of privileged accounts;
    defining a filter to specify the identity services whose privileged accounts will be hosted by the proxy service;
    assigning a group of the proxy service to a shared ID authorization account, the assigning to the respective account being managed by an identification (ID) pool manager; and
    sharing the use of the privileged account with the shared ID authorization account;
    wherein the lifecycle of a shared privileged account is managed by the shared privileges module performing:
    an account access authorization request operation in response to a shared privileged account being received by the proxy service, wherein the access request operation obtains approval of access;
    an account sign-out operation in response to a shared ID authorization account request being received by the proxy service, wherein the account sign-out operation:
       generates a shared ID authorization account record comprising the shared usage relationship of the shared ID authorization account and the requestor and account sign-out information;
       associates the shared ID authorization account with the requestor;

generates a new password for use of the shared privileged account by the requestor; and an account sign-in operation upon expiration of the shared ID authorization account or its end of use by the requestor, wherein the account sign-in operation:
disassociates the shared privileged account from the requestor;
disables the use of the new password with the shared privileged account;
updates the shared ID authorization account record with account sign-in information; and an authorization removal operation deleting the shared ID authorization account when access to the system is no longer needed.

11. The non-transitory computer usable medium of claim 10, further comprising:
mapping respective systems and applications to the group, wherein the shared privileged account is used by the group to access the respective systems and applications.

12. The non-transitory computer usable medium of claim 10, further comprising managing the lifecycle of the shared privileged account.

13. The non-transitory computer usable medium of claim 12, further comprising deleting the privileged account and its associated access to the respective systems and applications.

14. The non-transitory computer usable medium of claim 10, wherein the password of the privileged account is automatically reset upon deletion of the shared ID authorization account.

15. The non-transitory computer usable medium of claim 10, wherein recertification and requested use justification operations related to the requestor are performed to recertify the requestor and justify the use of the privileged account by the requestor.

16. The non-transitory computer usable medium of claim 10, wherein:
the account sign-out information comprises a starting date and a starting time for the requestor to begin use of the shared privileged account; and
the account sign-in information comprises an ending date and an ending time for the requestor to end use of the shared privileged account.

17. The non-transitory computer usable medium of claim 16, wherein the account sign-out and sign-in information is used to generate shared privileged account usage reports and associated audit trail information related to shared privileged account lifecycle events.

18. The non-transitory computer usable medium of claim 10, wherein each group comprises a predetermined privilege and contains a pool of privileged accounts managed by the pool manager through a pluggable interface.

19. The non-transitory computer usable medium of claim 10, wherein the computer executable instructions are deployable to a client computer from a server at a remote location.

20. The non-transitory computer usable medium of claim 10, wherein the computer executable instructions are provided by a service provider to a customer on an on-demand basis.

* * * * *